United States Patent
Tame et al.

(10) Patent No.: US 9,701,223 B2
(45) Date of Patent: Jul. 11, 2017

(54) DISC RECLINER WITH TAPERED PIN CAM SURFACE

(71) Applicant: MAGNA SEATING INC., Aurora, Ontario (CA)

(72) Inventors: Omar D Tame, West Bloomfield, MI (US); Macit Aktas, Windsor (CA)

(73) Assignee: Magna Seating Inc, Aurora, Ontario (CA)

( * ) Notice: Subject to any disclaimer, the term of this patent is extended or adjusted under 35 U.S.C. 154(b) by 110 days.

(21) Appl. No.: 14/777,107

(22) PCT Filed: Mar. 18, 2014

(86) PCT No.: PCT/CA2014/000277
§ 371 (c)(1),
(2) Date: Sep. 15, 2015

(87) PCT Pub. No.: WO2014/146194
PCT Pub. Date: Sep. 25, 2014

(65) Prior Publication Data
US 2016/0023578 A1    Jan. 28, 2016

Related U.S. Application Data

(60) Provisional application No. 61/802,885, filed on Mar. 18, 2013.

(51) Int. Cl.
*B60N 2/235* (2006.01)
*B60N 2/22* (2006.01)
*B60N 2/23* (2006.01)

(52) U.S. Cl.
CPC ......... *B60N 2/2362* (2015.04); *B60N 2/2227* (2013.01); *B60N 2/233* (2013.01); *B60N 2/2356* (2013.01)

(58) Field of Classification Search
None
See application file for complete search history.

(56) References Cited

U.S. PATENT DOCUMENTS

| 6,527,342 B2 * | 3/2003 | Glaspie | B60N 2/2218 297/373 |
| 6,719,372 B2 * | 4/2004 | Glaspie | B60N 2/2218 297/373 |

(Continued)

FOREIGN PATENT DOCUMENTS

| JP | CN 1239648 A  * | 12/1999 | B60N 2/2356 |
| JP | EP 0967112 A2 * | 12/1999 | B60N 2/2356 |

(Continued)

*Primary Examiner* — David E Allred
(74) *Attorney, Agent, or Firm* — Miller Canfield

(57) ABSTRACT

A disc recliner comprises a fixed guide plate coupled to a rotatable tooth plate. Pawls are movable between a first position interlocking the guide plate and tooth plate in a locked condition and a second position disengaged from the tooth plate in an unlocked condition to allow pivotal movement therebetween. A shaft extends through the guide plate and the tooth plate and a cam is fixedly mounted on the shaft for engagement with the pawls. A drive nut is fixedly mounted to the guide plate for rotation therewith. A drive screw is fixedly mounted to the shaft and matingly engaged with the drive nut wherein rotation of the shaft rotates the drive screw and the drive nut causes lateral movement of the shaft and cam along an axis to drive the pawls between the first and second positions thereby actuating the disc recliner between a locked and unlocked conditions.

10 Claims, 6 Drawing Sheets

(56) References Cited

U.S. PATENT DOCUMENTS 6,824,216 B2 11/2004 Uramichi
6,869,143 B2 3/2005 Secord

FOREIGN PATENT DOCUMENTS

JP   EP 0967112 A3 * 4/2001 ........... B60N 2/2356
WO   2008091247     7/2008

* cited by examiner

DISC RECLINER WITH TAPERED PIN CAM SURFACE

BACKGROUND OF THE INVENTION

1. Field of the Invention

The present invention relates to a disc recliner for a vehicle seat assembly that allows pivotal adjustment of a seat back relative to a seat cushion. More particularly, the present invention relates to a disc recliner having a lateral drive screw with a tapered pin cam surface for actuating a plurality of locking pawls between locked and unlocked positions to allow selective pivotal movement of a seat back relative to a seat cushion.

2. Description of Related Art

Automotive vehicles typically include one or more seat assemblies having a seat cushion and a seat back for supporting passengers above a vehicle floor. The seat assembly is commonly mounted to the vehicle floor by a seat track assembly for providing fore and aft adjustment of the seat assembly for passenger comfort. The seat back is typically pivotally coupled to the seat cushion by a recliner assembly for providing pivotal adjustment of the seat back relative to the seat cushion.

It is common that the recliner assembly includes a pair of spaced apart disc recliners that operatively and pivotally couple the seat back to the seat cushion. A typical disc recliner generally includes a fixed plate secured to the seat cushion and a movable plate secured to the seat back and rotatably coupled to the fixed plate. The disc recliner also includes a locking mechanism to secure the movable plate to the fixed plate thereby maintaining the seat back in a reclined seating position. One type of locking mechanism includes one or more pawls with each pawl having a plurality of teeth. The pawls are movable, either slidably or pivotally, in a radial direction between a locked position and an unlocked position. With the pawls in the locked position, the teeth on the pawls are engaged with an annular rim of teeth on the movable plate, thus locking the seat back relative to the seat cushion. With the pawls in the unlocked position, the teeth on the pawls are disengaged from the annular rim of teeth on the movable plate, thus allowing pivotal adjustment of the seat back relative to the seat cushion between a plurality of reclined seating positions.

The pawls are typically spring biased to the locked position through a cam that is mounted on a shaft. An actuation torque is applied to rotate the shaft and cam and overcome the spring bias, which allows the pawls to move from the locked position to the unlocked position. However, the cam mounted on the shaft for engagement with the pawls spaced circumferentially thereabout increases the overall diameter of the disc recliner and decreases the number of pawls used to engage the movable plate in the locked position.

It is desirable, therefore, to provide a disc recliner with a lateral drive screw having a tapered pin cam surface for engaging the plurality of pawls between the locked and unlocked positions thereby reducing the overall diameter of the disc recliner and allowing an increase in the number of pawls used to engage the movable plate in the locked condition to increase load capabilities of the disc recliner.

SUMMARY OF THE INVENTION

According to one aspect of the invention, a disc recliner is operatively coupled between a seat back and a seat cushion for providing selective pivotal movement of the seat back between a plurality of reclined seating positions. The disc recliner comprises a guide plate adapted to be mounted to one of the seat back and seat cushion and a tooth plate adapted to be mounted to the other of the seat back and seat cushion, wherein the tooth plate is rotatably coupled to the guide plate. At least one pawl is operatively coupled to the guide plate and movable between a first position engaging the tooth plate, thereby interlocking the guide plate and the tooth plate in a locked condition to prevent pivotal movement of the seat back, and a second position disengaged from the tooth plate, thereby unlocking the guide plate and the tooth plate in an unlocked condition to allow pivotal movement of the seat back. A shaft extends laterally along an axis through the guide plate and the tooth plate and a cam is fixedly mounted on the shaft for selective engagement with the pawls. A drive nut is fixedly mounted to the guide plate for rotation therewith. A drive screw is fixedly mounted to the shaft adjacent the cam and matingly engaged with the drive nut wherein rotation of the shaft rotates the drive screw within the drive nut and the drive nut causes lateral movement of the shaft and cam longitudinally along the axis to drive the at least one pawl between the first and second positions thereby actuating the disc recliner between the locked and unlocked condition and allowing selectively pivotal movement of the seat back relative to the seat cushion.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
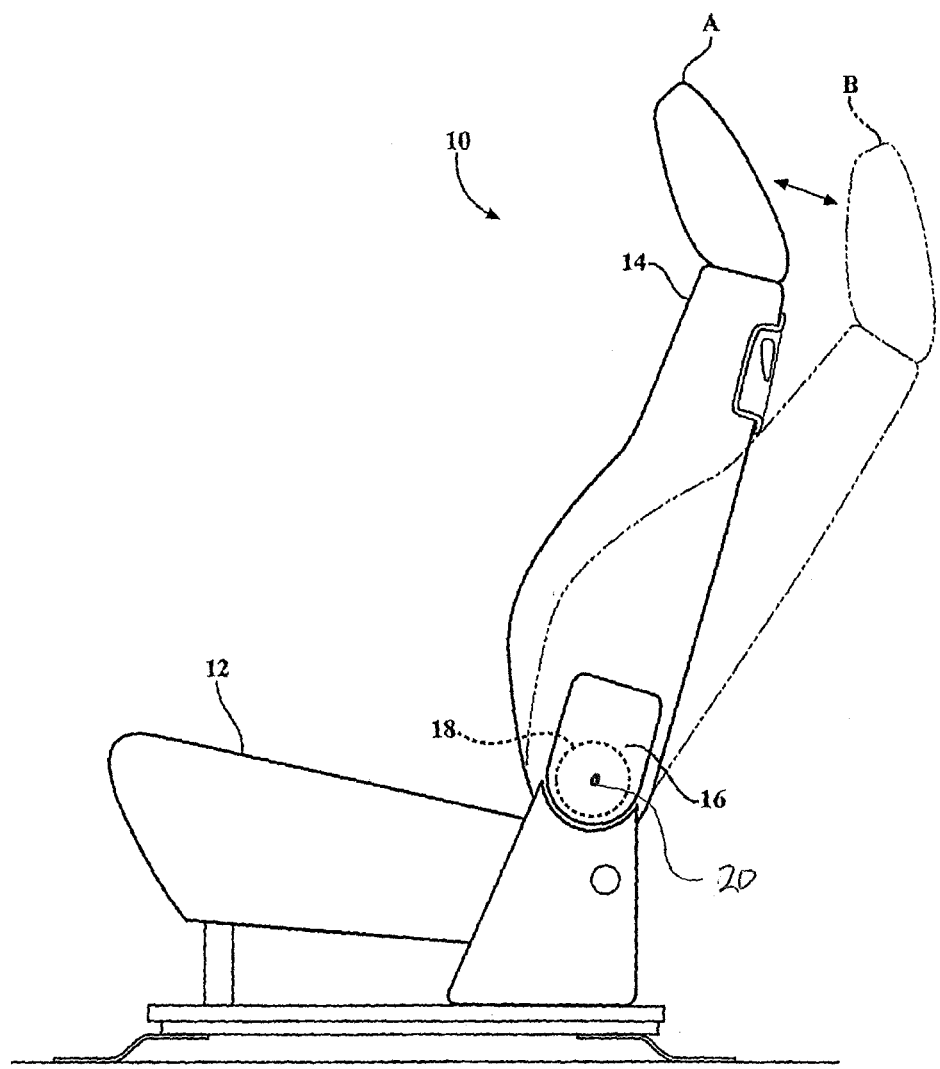
FIG. 1 is a side view of a vehicle seat assembly including a seat back operatively coupled to a seat cushion with a disc recliner.

Referring to the Figures, wherein like numerals indicate like or corresponding parts throughout the several views, a seat assembly for use in an automotive vehicle is generally shown at 10. Referring to FIG. 1, the seat assembly 10 includes a generally horizontal seat cushion 12 and a generally upright seat back 14 operatively and pivotally coupled by a recliner assembly 16 to the seat cushion 12. The recliner assembly 16 includes a pair of spaced apart and synchronized disc recliners 18 (one shown).

The disc recliners 18 are operable between a locked condition, preventing pivotal movement of the seat back 14 relative to the seat cushion 12, and an unlocked condition, allowing pivotal adjustment of the seat back 14 relative to the seat cushion 12 about a laterally extending axis 20 between an upright seating position A and a plurality of reclined seating positions, one of which is shown at B. Only one of the disc recliners 18 will be described in detail.

Figure 2:
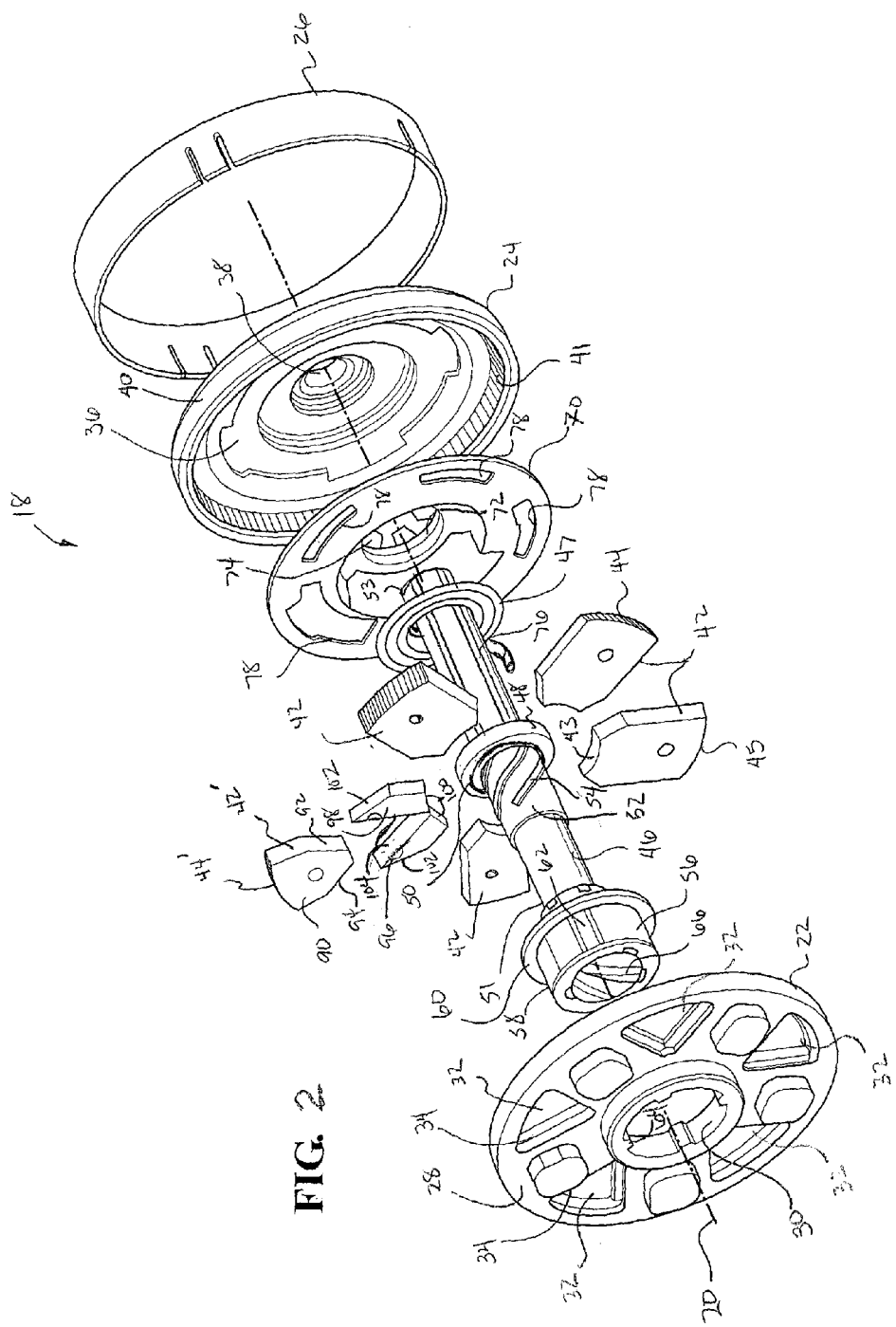
FIG. 2 is an exploded view of the disc recliner according to one embodiment of the invention with an internal clock spring.

Referring to FIG. 2, the disc recliner 18 generally includes a fixed guide plate 22 that is adapted to be mounted to the seat cushion 12 and a movable tooth plate 24 that is adapted to be mounted to the seat back 14, as is commonly known in the art. The guide plate 22 and the tooth plate 24 are held together by a retaining ring 26 in a manner well known in the art such that the tooth plate 24 can rotate about the pivot axis 20 relative to the guide plate 22. It is understood that rotation of the tooth plate 24 relative to the guide plate 22 causes pivotal movement of the seat back 14 relative to the seat cushion 12.

The guide plate 22 is circular and includes an end wall 28 having a first central bore 30 extending axially therethrough. The first central bore 30 is coaxial with the pivot axis 20. An outer side of the end wall 28 is adapted to be fixedly secured to the seat cushion 12 by any suitable means. An inner side of the guide plate 22 includes a series of embossments 32 that define generally parallel and opposing guide surfaces 34.

The tooth plate 24 is circular, generally cup-shaped, and includes an end wall 36 having a second central bore 38 extending axially therethrough. The second central bore 38 is also coaxial with the pivot axis 20. An outer side of the end wall 36 is adapted to be fixedly secured to the seat back 14 by any suitable means. A side wall 40 extends axially from the end wall 36 and circumferentially around the tooth plate 24. A plurality of radially extending teeth 41 is disposed around the inside of the side wall 40.

A plurality of pawls 42 are guided by and between opposing guide surfaces 34 of the embossments 32 on the guide plate 22 and move radially inward and outward to actuate the disc recliner 18 between the locked and unlocked conditions. In the embodiment shown, there are five pawls 42 and each pawl 42 includes an inner proximal edge 43 and an opposite outer circumferential distal edge 45 having a plurality of radially extending teeth 44 adapted for meshing engagement with the teeth 41 on the tooth plate 24. In the locked condition, the pawls 42 are disposed in a first locked position such that the teeth 44 on the pawls 42 are in meshing engagement with the teeth 41 on the tooth plate 24 to prevent rotation of the tooth plate 24 relative to the guide plate 22. In an unlocked condition, the pawls 42 are disposed in a second unlocked position such that the teeth 44 on the pawls 42 are disengaged from the teeth 41 on the tooth plate 24 to allow rotation of the tooth plate 24 relative to the guide plate 22.

The pawls 42 move radially inward and outward between the first and second positions in response to rotation of a shaft 46. The shaft 46 extends axially through the first central bore 30 in the guide plate 22 and the second central bore 38 in the tooth plate 24. A cam 48 is fixedly mounted on the shaft 46 for rotation therewith and includes a tapered pin cam surface 50 for engagement with the inner edge 43 of the pawls 42. A spring 47 encircles the shaft 46 and includes a first end secured to the shaft 46 and an opposite second end secured to the guide plate 22 for biasing the shaft 46 in a first direction (clockwise when viewed in FIGS. 4 and 6) such that the cam 48 normally urges the pawls 42 radially outward to the first position such that the outwardly-facing teeth 44 on the pawls 42 are in meshing engagement with the inwardly-facing teeth 41 on the tooth plate 24 to prevent rotation of the tooth plate 24 relative to the guide plate 22. Rotation of the shaft 46 in an opposite second direction rotates the cam 48 in the second direction, thereby moving the pawls 42 radially inward to the second position such that the outwardly facing teeth 44 on the pawls 42 are disengaged from the inwardly-facing teeth 41 on the tooth plate 24 to allow rotation of the tooth plate 24 relative to the guide plate 22.

More specifically, the shaft 46 extends between opposite first and second ends 51, 53. The cam 48 is secured to the shaft 46 approximately midway between the first and second ends 51, 53. The tapered pin cam surface 50 tapers from a leading end facing the first end 51 to a trailing end facing towards the second end 53. A lead drive screw 52 is mounted about the shaft 46 for rotation therewith immediately adjacent the leading end of the tapered pin cam surface 50 and includes a plurality of helical threads 54 extending through the central bore 30 of the guide plate 22. The cam 48, shaft 46, and drive screw 52 can be formed individually, as pairs, or as a single piece without varying from the scope of the invention. A cylindrical drive nut 56 is fixedly secured within the central bore 30 of the guide plate 22 for receiving the shaft 46 and drive screw 52 therethrough. The drive nut 56 includes a cylindrical body portion 58 extending through the central bore 30 and an end collar 60 abutting against the end wall 28 of the guide plate 22. The outer surface of the body portion 58 includes a plurality of spaced apart axial grooves 62 aligned with corresponding axial ribs 64 spaced radially about the inner circumference of the central bore 30 whereby the drive nut 56 is rotatably fixed with the guide plate 22, however, the shaft 46 is allowed to travel axially through the drive nut 56. The inner surface of the body portion 58 includes a plurality of helical threads 66 for threadably receiving the helical threads 54 on the drive screw 52.

A control plate 70 is disposed adjacent the pawls 42 and is operatively coupled to the shaft 46 for rotation therewith. That is, the control plate 70 includes a third central bore 72 for axially receiving the shaft 46 therethrough. A plurality of spaced apart tabs 74 projecting radially inwardly from the third central bore 72 and are slidably received in corresponding channels 76 recessed along the axial length of the shaft 46 whereby the control plate 70 is constrained from rotation with respect to the shaft 46 but allowed to slide axially along the shaft 46. The control plate 70 is adapted for moving the pawls 42 radially inward to the second unlocked position in response to rotation of the shaft 46 in the second direction. More specifically, the control plate 70 includes a plurality of slots 78 therein having an offset profile that receive, guide and engages tabs 80 projecting orthogonally from the face of the pawls 42 to move the pawls 42 radially inward in response to rotation of the shaft 46 in the second direction (counterclockwise when viewed in FIGS. 4 and 6). The offset profile of the slots 78 allows the cam 48 to move the pawls 42 radially outward to the first position in response to rotation of the shaft 46 in the first direction.

Figure 3:
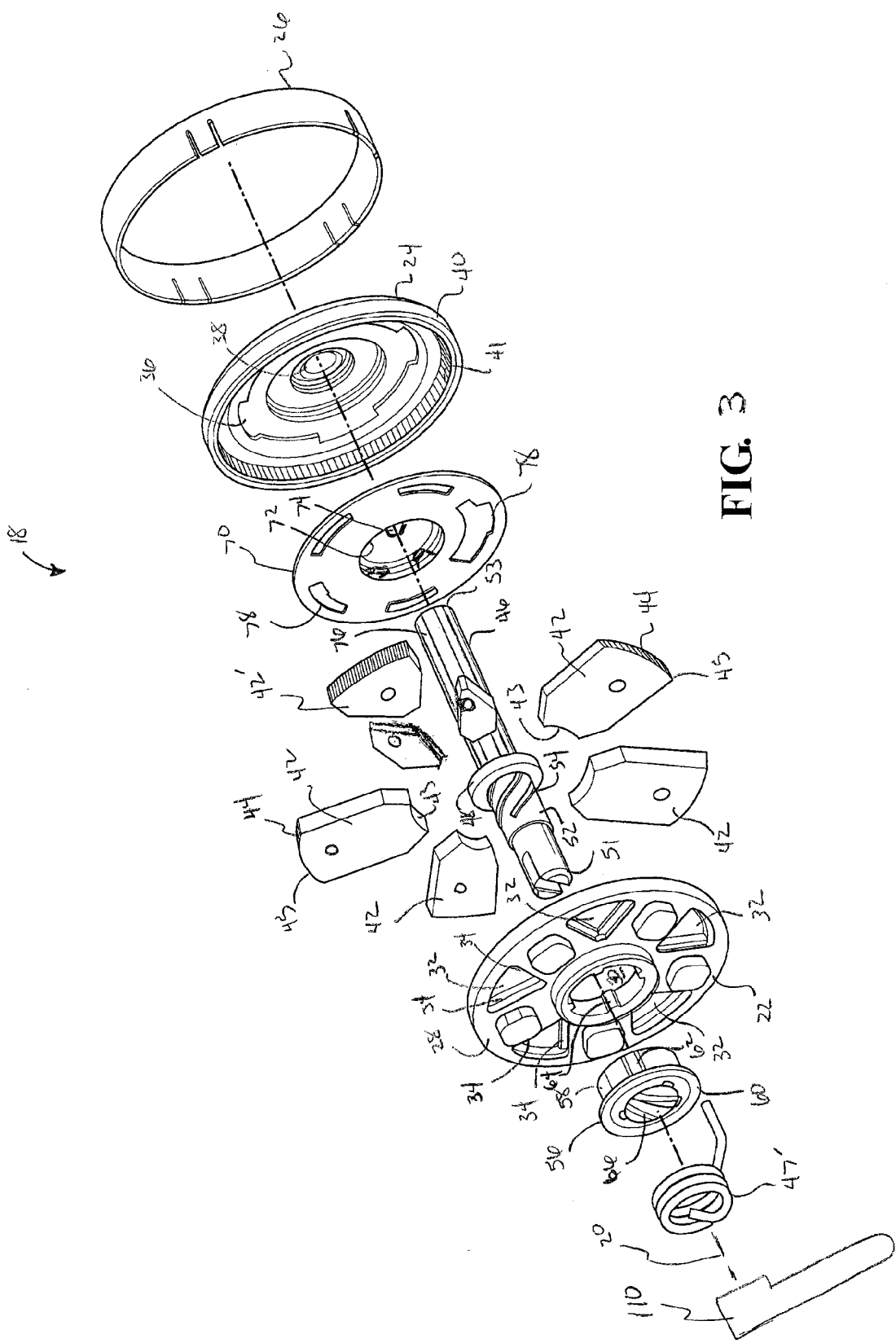
FIG. 3 is an exploded view of the disc recliner according to an alternative embodiment of the invention with an external coil spring.
Figure 4:
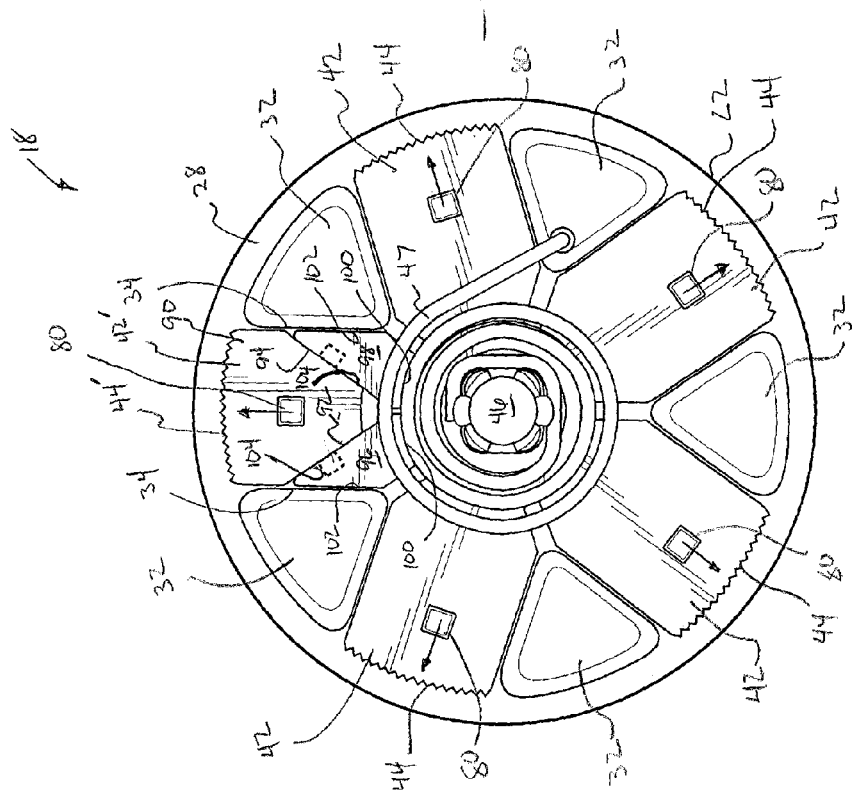
FIG. 4 is a side view of the disc recliner of FIG. 2 with a movable tooth plate and control plate removed to illustrate the clock spring urging a set of pawls into a locked position.

In the embodiment shown in FIGS. 2 and 4-7, the shaft 46 is biased in the first direction by an internal clock spring 47 encircling the shaft 46 and seated between the pawls 42 and the control plate 70. The clock spring 47 has one end secured to the shaft 46 and an opposite end secured to the fixed guide plate 22 as shown in FIG. 4. Alternatively, in a second embodiment shown in FIG. 3, the shaft 46 is biased in the first direction by an external coil spring 47' encircling the shaft 46 and seated on the first end 51 thereof distal of the guide plate 22. The coil spring 47' similarly has one end secured to the shaft 46 and an opposite end secured to the fixed guide plate 22.

Additionally, one or more of the pawls 42 may include a split anti-chuck pawl as shown at 42' in the Figures. The split anti-chuck pawl 42' includes a main pawl 90 extending between opposing tapered inner side edges 92, 94 and an outer edge having a plurality of radial teeth 44' for engaging the teeth 41 on the tooth plate 24. The anti-chuck pawl 42' also includes a pair of wedge pawls 96, 98 seated on opposite sides of the tapered inner side edges 92, 94 of the main pawl 90. Each wedge pawl 96, 98 includes an inner edge 100 for engagement with the cam 48, an outer side 102 for sliding engagement with the guide surfaces 34 formed by the embossments 32 on the guide plate 22, and a tapered inner side 104 for sliding engagement with a respective tapered inner side edge 92, 94 of the main pawl 90. Referring to FIG. 4, as the cam 48 forces the pawls 42, 42' radially outwardly for engagement with the toothplate 24 in the locked condition, the wedge pawls 96, 98 slide along the tapered inner side edges 92, 94 of the main pawl 90 forcing the main pawl 90 radially into engagement with the teeth 41 on the toothplate 24 while also expanding laterally into the guide surfaces 34 of the guide plate 22 thereby removing any chuck, or space, between the pawl 42' and the guide surfaces 34. Further, each of the main pawl 90 and wedge pawls 96, 98 include a tab 80 received in a profiled slot 78 in the control plate 70 for actuating the pawl 42' to the second unlocked position in response to rotation of the shaft 46 in the second direction.

Finally, a recliner handle or knob 110 is mounted to an end of the shaft 46 to operate the disc recliner 18 between the locked and unlocked conditions, as shown schematically in FIG. 3. The recliner handle 110 is biased in the first direction, clockwise as viewed in the Figures, by the spring 47, 47' biasing the shaft 46 thereby maintaining the pawls 42, 42' in the locked position engaged with the teeth 41 on the tooth plate 24 and preventing rotation of the tooth plate 24 relative to the guide plate 22.

Figures 6, 7:
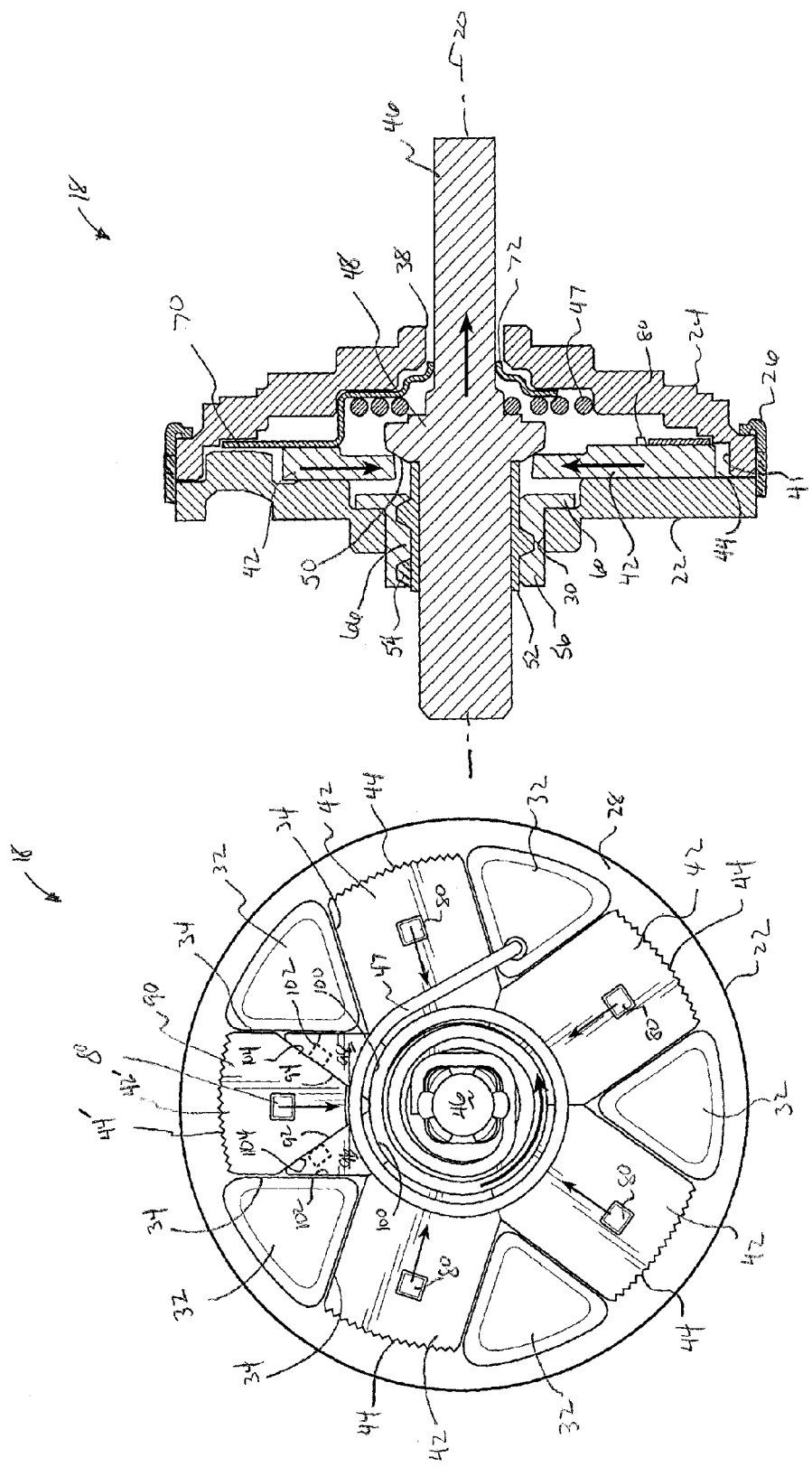
FIG. 6 is a side view of the disc recliner of FIG. 2 with the movable tooth plate and control plate removed to illustrate the set of pawls in an unlocked position.
FIG. 7 is a cross-sectional view of the assembled disc recliner of FIG. 2 in the unlocked position.
Figure 9:
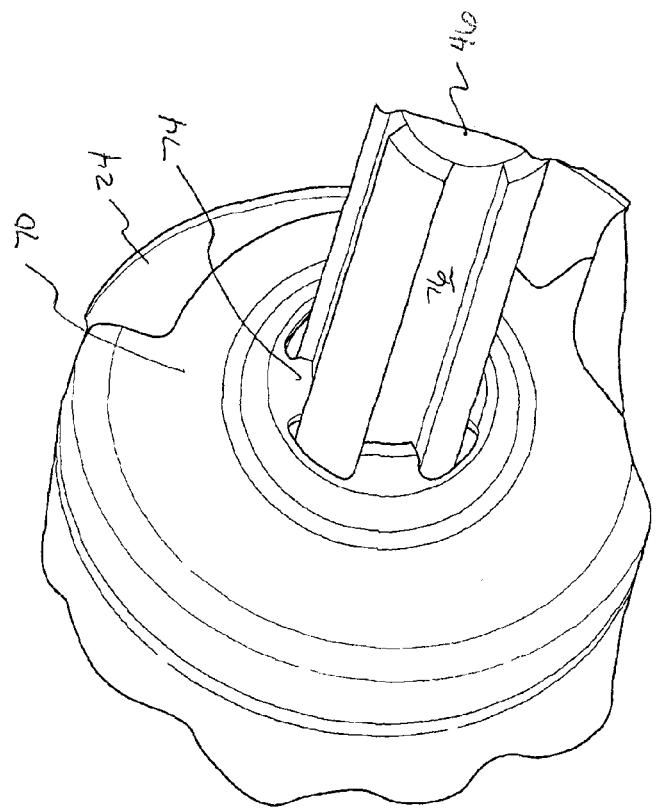
FIG. 9 is a fragmentary perspective view of the disc recliner shaft engaged with the control plate.
Figure 8:
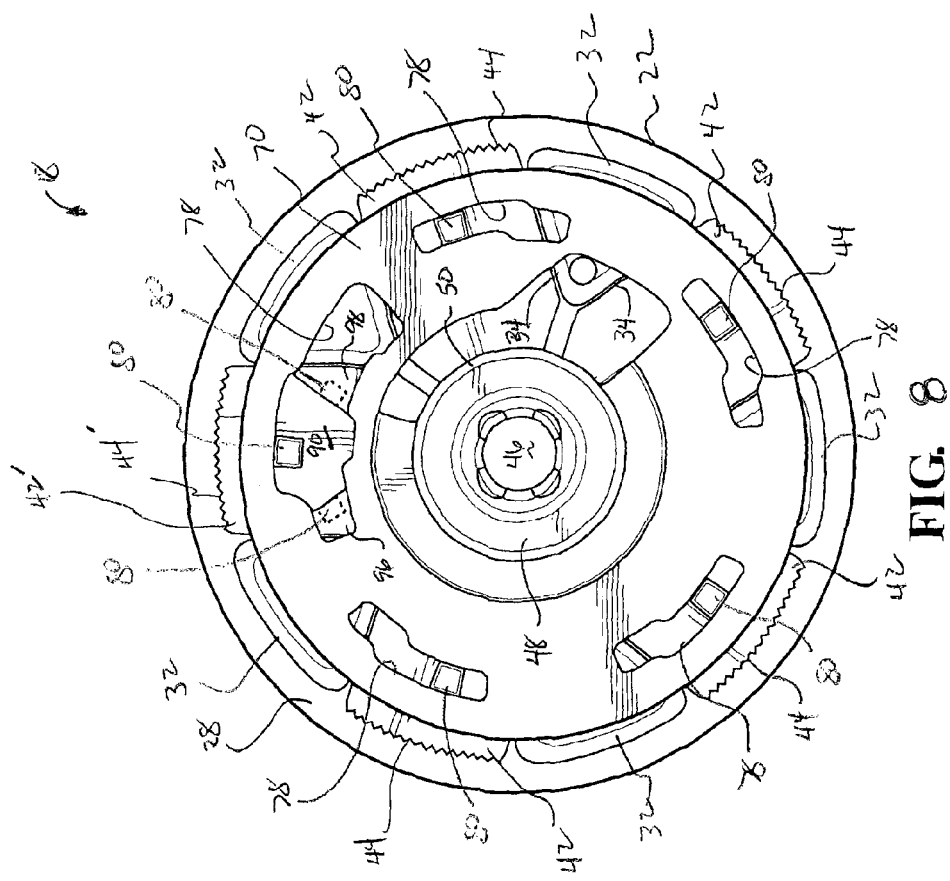
FIG. 8 is a side view with the movable tooth plate removed illustrating the control plate engaged with the pawls in the locked position.

Referring to FIGS. 6 and 7, in order to actuate the disc recliner 18 from the locked condition to the unlocked condition and allow the seat back 14 to pivot relative to the seat cushion 12, the recliner handle 110 is rotated in the second direction, counterclockwise, against the bias of the spring 47, 47'. The recliner handle 110 thus rotates the shaft 46 in the second direction, counterclockwise. The fixed drive nut 56 forces the drive screw 52 to move the shaft 46 laterally along the axis 20 in response to the rotation of the shaft 46 in the second direction. That is, the threaded engagement between the helical threads 66 of the drive nut 56 and the helical threads 54 of the drive screw 52 causes the drive screw 52 to rotate and move laterally along the axis 20 relative to the drive nut 56. The lateral movement of the drive screw 52 fixed to the shaft 46 cause rotational and lateral movement of the shaft 46 along the axis 20 thereby moving the cam 48 out of camming engagement with the inner edges 43 of the pawls 42, 42'. The rotation of the shaft 46 further causes rotation of the control plate 70 whereby the profiled slots 78 engage the tabs 80 on the pawls 42, 42', thereby retracting the pawls 42, 42' radially inwardly from the locked position to the unlocked position and spaced from engagement with the tooth plate 24. Now with the disc recliner 18 in the unlocked condition, the tooth plate 24 is rotatable relative to the guide plate 22 thereby allowing pivotal movement of the seat back 14 relative to the seat cushion 12.

Figure 5:
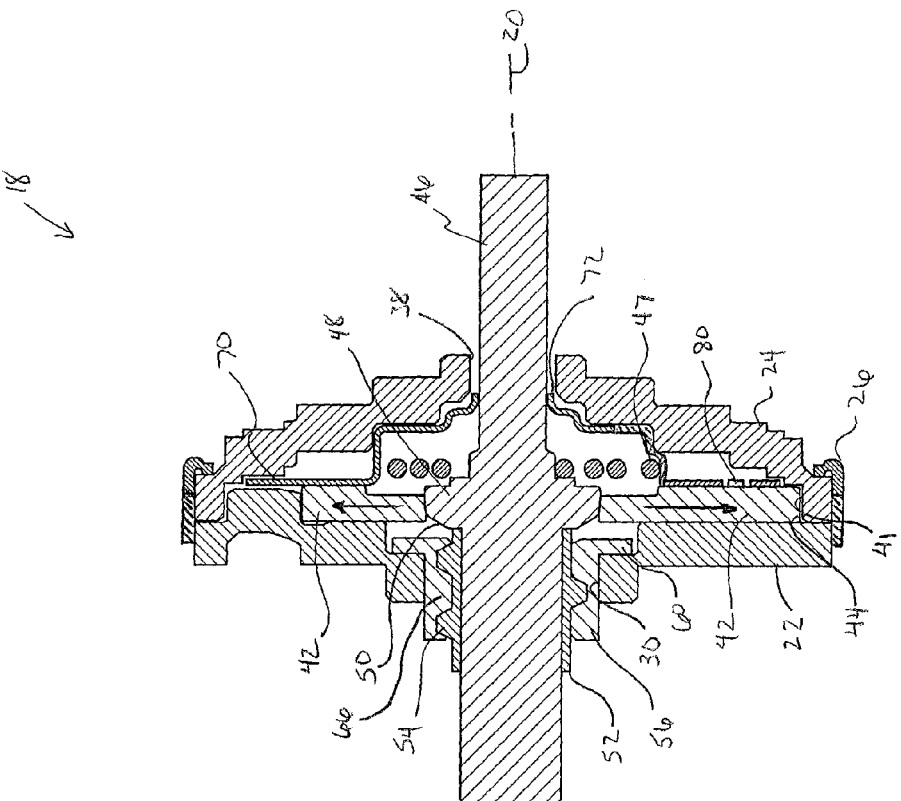
FIG. 5 is a cross-sectional view of the assembled disc recliner of FIG. 2 in the locked position.

Referring to FIGS. 4 and 5, in order to return the disc recliner 18 to the locked condition and prevent further pivotal movement of the seat back 14 relative to the seat cushion, the recliner handle 110 is released to rotate the shaft 46 in the first, clockwise, direction by the bias of the spring 47, 47'. As the spring 47, 47' biases the shaft 46 to rotate in the first, clockwise, direction the drive nut 56 forces the drive screw 52 to rotate and move the shaft 46 laterally along the longitudinal axis 20 in the opposite direction. The lateral movement of the shaft 46 forces the tapered pin cam surface 50 of the cam 48 to engage the inner edges 43 of the pawls 42, 42'. The cam 48 forces the pawls 42, 42' to slide radially outwardly along the guide surfaces 34 formed by the embossments 32 in the guide plate 22 until the teeth 44 of the pawls 42, 42' engage with the teeth 41 on the tooth plate 24, returning the disc recliner 18 to the locked condition to prevent pivotal movement of the tooth plate 24 relative to the guide plate 22 and thus preventing further pivotal movement of the seat back 14 relative to the seat cushion 12.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A disc recliner operatively coupling a seat back to a seat cushion for providing selective pivotal movement of the seat back between a plurality of reclined seating positions, said disc recliner comprising:
    a guide plate adapted to be mounted to one of the seat back and seat cushion;
    a tooth plate adapted to be mounted to the other of the seat back and seat cushion, wherein said tooth plate is rotatably coupled to said guide plate;
    at least one pawl operatively coupled to said guide plate and movable between a first position engaging said tooth plate, thereby interlocking said guide plate and said tooth plate in a locked condition to prevent pivotal movement of the seat back, and a second position disengaged from said tooth plate, thereby unlocking said guide plate and said tooth plate in an unlocked condition to allow pivotal movement of the seat back;
    a shaft extending laterally along an axis through said guide plate and said tooth plate;
    a cam fixedly mounted on said shaft for selective engagement with said pawls;
    a drive nut fixedly mounted to said guide plate; and
    a drive screw fixedly mounted to said shaft adjacent to said cam and matingly engaged with said drive nut wherein rotation of said shaft rotates said drive screw within said drive nut and said drive nut causes lateral movement of said shaft and cam along said axis to drive said at least one pawl between said first and second positions thereby actuating said disc recliner between said locked and unlocked conditions and allowing selectively pivotal movement of the seat back relative to the seat cushion.

2. The disc recliner as set forth in claim 1 wherein said drive nut includes internal helical threads for mating engagement with external helical threads on said drive screw whereby rotation of said shaft causes rotational and lateral movement of said shaft along said axis.

3. The disc recliner as set forth in claim 2 wherein each of said pawls includes an inner edge and an opposite outer edge and said cam includes a tapered pin cam surface for camming engagement with said inner edge of said pawl to slidably move said pawl radially into engagement with said tooth plate in said locked condition.

4. The disc recliner as set forth in claim 3 wherein said tooth plate includes an end wall having a central bore for receiving said shaft therethough and a circumferential side wall extending from said end wall and defining a plurality of teeth, each of said pawls includes a plurality of teeth formed in the outer edge thereof for locking engagement with said teeth of said tooth plate in said locked condition.

5. The disc recliner as set forth in claim 4 wherein said guide plate includes an end wall having a central bore for receiving said shaft therethrough and a plurality of spaced apart ribs extending radially from said central bore, said drive nut including a cylindrical main body extending through said central bore of said guide plate and having a plurality of recessed grooves extending axially along said main body for receiving said corresponding ribs in said central bore of said guide plate to rotatably lock said drive nut to said guide plate.

6. The disc recliner as set forth in claim 5 wherein said drive nut includes an end collar extending radially from one end of said main body for engaging said end wall of said guide plate to axially lock said drive nut to said guide plate.

7. The disc recliner as set forth in claim 6 wherein said guide plate includes a plurality of spaced apart embossments projecting outwardly from said end wall thereof, wherein each of said embossments includes opposite side guide surfaces for guiding said pawls between said first and second positions.

8. The disc recliner as set forth in claim 7 further including a spring having a first end fixedly secured to said shaft and an opposite second end fixedly secured to said guide plate for biasing said shaft in a first direction forcing said pawls into engagement with said tooth plate in said locked condition.

9. The disc recliner as set forth in claim 8 further including a control plate seated between said plurality of pawls and said tooth plate and having a central bore for slidably receiving said shaft therethrough, said control plate having a plurality of slots formed therein for receiving a tab projecting orthogonally from each of said pawls whereby rotation of said shaft in said second direction rotates said control plate and said slots guide said tabs along a slot profile to retract said pawls radially inwardly out of engagement with said tooth plate in said unlocked condition.

10. The disc recliner as set forth in claim 9 wherein said central bore of said control plate includes a plurality of radially extending tabs received in corresponding axial channels formed along the length of said shaft wherein the control plate is coupled for rotation with said shaft and said shaft is slidably coupled to said control plate along said axis.

\* \* \* \* \*